Jan. 1, 1963 D. I. CRONIN 3,071,399
JOINT FOR TUBULAR MEMBERS
Filed May 23, 1960
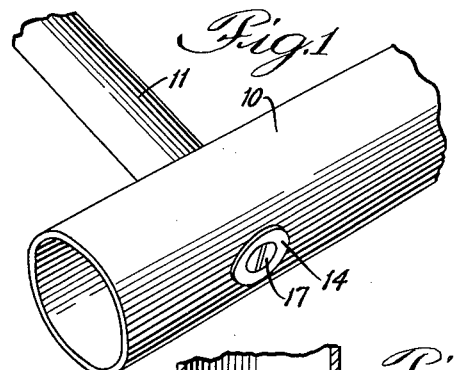
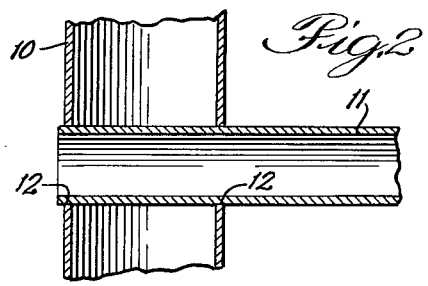
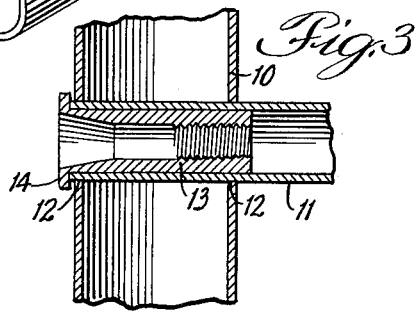
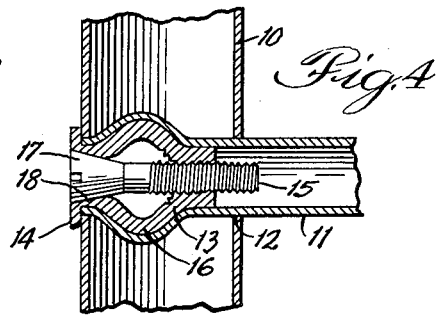
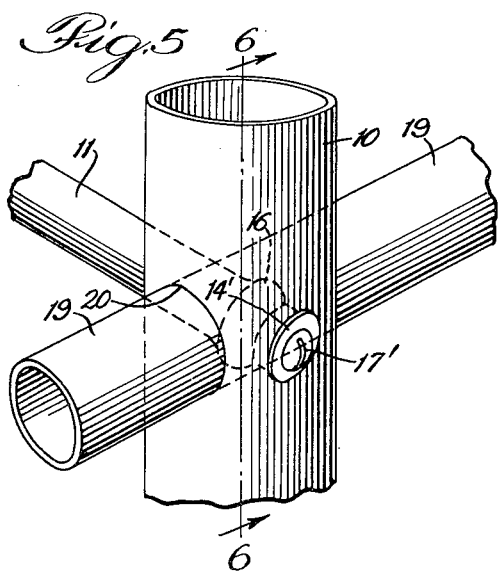
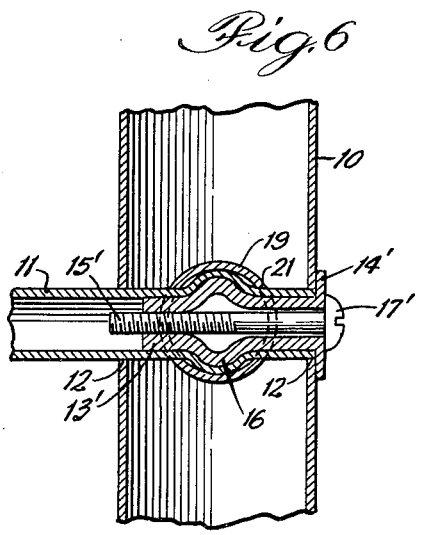
INVENTOR:
David I. Cronin,
BY Dawson, Tilton, Fallon & Lungmus,
ATTORNEYS.

United States Patent Office 3,071,399
Patented Jan. 1, 1963

3,071,399
JOINT FOR TUBULAR MEMBERS
David I. Cronin, Chicago, Ill., assignor to Star Surgical Instrument and Manufacturing Company, Chicago, Ill., a corporation of Illinois
Filed May 23, 1960, Ser. No. 30,835
8 Claims. (Cl. 287—54)

This invention relates to the interconnection of tubular members. More specifically, the invention relates to a secure joint between two or more tubular members and to a method for forming that joint.

A main object of the present invention is to provide a secure joint between a plurality of tubular members without distorting any portions of those members visible after the joint is formed. A further object is to provide a simple and highly effective method and means for joining a plurality of tubular members without welding, soldering or otherwise bonding those members together. Another object is to provide a tubular joint wherein integral portions of two or more tubular members are utilized to provide a secure interlock between the parts. A still further object is to provide a joint for tubular members so that the members may be easily and quickly interconnected without the use of special machinery or tools. Another object is to provide a secure interconnection between tubular members which is capable of being easily and quickly tightened should the joint become loosened after long periods of abusive use.

Other objects will appear from the specification and drawings in which:

FIGURE 1 is a broken perspective view illustrating a joint embodying the present invention;

FIGURE 2 is a broken sectional view illustrating a preliminary step in the formation of the joint shown in FIGURE 1;

FIGURE 3 is a broken sectional view similar to FIGURE 2 but showing a second step in the formation of the joint;

FIGURE 4 is a broken sectional view similar to FIGURES 2 and 3 but showing the relationship of parts after the joint has been completed;

FIGURE 5 is a broken perspective view illustrating a second embodiment of the invention;

FIGURE 6 is a broken sectional view taken along line 6—6 of FIGURE 5.

In the embodiment of the invention illustrated in FIGURES 1 through 4, the numeral 10 generally designates a cylindrical tubular member of relatively large diameter and the numeral 11 designates a cylindrical tubular member of smaller diameter. Specifically, the relationship of parts is such that the external diameter of the smaller tube is less than the internal diameter of the larger tube. The tubes may be formed from any suitable material such as metal or plastic. However, it is important that the material from which the tubes are formed, and particularly the inner tube 11, be non-brittle or deformable for reasons which will appear shortly.

Outer tube 10 is provided with a pair of openings 12 snugly receiving an end portion of the inner or smaller tube 11. In the illustration given, openings 12 are diametrically opposed and the inner tube is disposed with its axis extending at right angles to the longitudinal axis of the outer tube 10. In that portion of the inner tube disposed within outer tube 10 is a sleeve 13 of substantially the same diameter as the internal diameter of tube 11. One end of the sleeve projects axially beyond the end of the inner tube and is provided with an annular flange 14 of greater outer diameter than the diameter of openings 12. As indicated above, openings 12 have substantially the same diameter as the inner tube 11 when that tube is in an undeformed state.

Sleeve 13 is one element of a two piece expansion unit which constitutes the means for securely interlocking tubes 10 and 11. The other element of the unit is a threaded plug or screw 15, shown most clearly in FIGURE 4. In its normal unexpanded condition sleeve 13 is cylindrical in shape (FIGURE 3). The sleeve is formed from a malleable or deformable material, such as a fairly soft metal (aluminum, lead alloys, etc.) so that when its ends are urged together the intermediate portion of the sleeve will expand radially to form an annular bulge 16 (FIGURE 4).

The end of sleeve 13 remote from flange 14 is internally threaded for threadedly receiving the screw portion of plug 15. Plug 15 is provided with an enlarged head 17 adapted to engage bearing surfaces adjacent the flange of the sleeve for preventing or limiting axial movement of the plug into that sleeve. In the embodiment illustrated in FIGURES 1 through 4, head 17 is frusto-conical in shape and the bore of the sleeve adjacent flange 14 is provided with tapered or frusto-conical bearing surfaces 18 for circumferential engagement with the head.

To secure a pair of tubes together in the manner illustrated in FIGURES 1 through 4, openings 12 are first formed in the larger tube and the end portion of the smaller tube is then inserted therein. The flanged sleeve 13 is then placed into the open end of the smaller tube until end flange 14 bears against the end of tube 11 and is in close proximity to the curved surface of larger tube 10. Finally, plug 15 is threaded into the bore of sleeve 13. Rotation of the plug is continued even after the tapered side surfaces of the plug's head 17 bear against the frusto-conical bearing surfaces 18 and, as a result, the threaded end portion of the cylindrical sleeve is drawn towards the flanged end of that sleeve. Upon such axial contraction, the sleeve expands transversely or radially, bulging out the portion of the inner tube disposed within tube 10, and particularly that portion of the inner tube which is also nearest flange 14. The flange 14 bears against the end of tube 11 and against the surface of the outer tube 10 adjacent thereto, thereby limiting inward axial movement of the sleeve. As a result, the deformed sleeve and the tube 11 extending thereabout are firmly locked against axial and rotational movement with reference to the outer tube. This is accomplished without deforming the outer tube 11 and without the use of machinery or special tools. All that is required is a screwdriver for rotating plug 15 and thereby deforming sleeve 13 and tube 11.

If desired, the annular flange 14 may be preformed to conform with the curvature of the outer tube 10. However, as brought out above, the tightening of plug 15 forcefully urges the flange against the outer surface of the larger tube and, if the material from which sleeve 13 is formed is sufficiently soft and bendable, flange 14 will automatically assume the curvature of the larger tube.

Following interconnection of the parts, plug 15 may be removed and, if desired, any suitable fitting may be threaded into the deformed sleeve. However, in the absence of such a fitting or of a suitable replacement plug, it is preferred to leave plug 15 in place. The plug effectively seals the otherwise open end of tube 11 and, in the embodiment of FIGURES 1 through 4, gives a smooth appearance because of its flush fitting with flange 14. Furthermore, if plug 15 is left in place, it may be later tightened should the joint become loosened by severe abuse.

The structure illustrated in FIGURES 5 and 6 is substantially the same as the embodiment already described except that a third tube 19 is also locked in place. As in the preceding embodiment, tube 11 extends through diametrically opposed openings 12 in the larger tube 10.

In addition, however, tube 11 also extends through the intermediate tube 19 within the interior of the largest tube 10. In the illustration given tube 19 extends at right angles to both tubes 10 and 11 but it will be understood that such an arrangement is not essential. The only requirements are that tube 19 have an internal diameter substantially larger than the external diameter of tube 11 and have an external diameter smaller than the internal diameter of tube 10, and that it passes through openings 20 in the larger tube in such a way that it is intersected by smaller tube 11 within the passage of tube 10. As shown most clearly in FIGURE 6, the smaller tube 11 passes through diametrically opposed openings 21 in the intermediate tube 19.

Interlocking of the parts occurs in the manner illustrated in FIGURES 2 through 4 except that three tubes rather than two tubes are joined together in the second embodiment. The sleeve 13', provided with annular flange 14', is inserted into the open end of tube 11. Thereafter, plug 15' is threaded into the bore of the sleeve until buckling or bulging of the sleeve occurs. Such bulging deforms that portion of inner tube 11 within intermediate tube 19, preventing axial movement of the inner tube through the intermediate tube. Such axial movement is also prevented by flange 14' which bears against the outer surface of tube 10. Since the intermediate tube cannot move in the direction of the smaller tube (because it is locked in place by openings 20), all three tubes are firmly and immovably anchored together.

It will be noted that FIGURES 5 and 6 illustrate a modification of the sleeve and plug of the preceding embodiment. In the second embodiment, plug 15' is provided with a straight shank and a round head 17'. The bore of sleeve 13' is cylindrical and is not provided with the frusto-conical bearing surfaces 18 of the preceding embodiment. Instead, the undersurface of the round head 17 bears against the outer surface of flange 14' to limit inward axial movement of the plug.

While certain difference exist between the plugs and sleeves of the two embodiments, it will be understood that these differences are primarily to suit the preferences of the particular users and that a given plug or sleeve construction may be used with either embodiment. Thus, the double tube joint shown in FIGURES 1 through 4 may include the expansion unit of the second embodiment and the expansion unit of the first form may be used to interconnect three tubes in the manner illustrated in FIGURES 5 and 6.

It will be observed that flanges 14 and 14' contribute greatly in providing secure joints and in preventing axial movement of the smaller tubes following expansion thereof. Preferably, these flanges are formed integrally with sleeves 13 and 13'. However, it will be understood that the bearing flanges might also be attached to their sleeves and, in some cases, might constitute separate elements held in close association with the sleeves only by the plugs extending therethrough.

While in the foregoing I have disclosed two embodiments of the invention in considerable detail for purposes of illustration, it will be understood by those skilled in the art that many of these details may be varied without departing from the spirit and scope of the invention.

I claim:

1. A joint for tubular members comprising a first tube having a pair of opposing side wall openings, a second tube extending through both of said openings and terminating adjacent the outer surface of said first tube about one of said openings, and an insert element disposed within the portion of the second tube located within said first tube, said insert element having a flanged portion engaging the outer surface of said first tube about said one of said openings, said insert element and said second tube being axially contracted and bulging outwardly within said first tube to lock said first and second tubes together, said outwardly bulging portion of said second tube being disposed adjacent said one opening and having inner and outer diameters exceeding the diameter of said one opening, said flanged portion bearing tightly against said outer surface for limiting the axial contraction of said second tube in one direction.

2. A tubular joint comprising a first tube having transverse openings therein, a second tube extending into the interior of said first tube through at least one of the openings thereof, said second tube being provided with opposing openings within the confines of said first tube, and a third tube extending through said opposing openings of said second tube and through transverse openings of said first tube to lock all of said tubes together, said third tube being provided with an annular enlargement within the confines of said second tube.

3. The structure of claim 2 in which an insert element has an enlarged shank portion secured against axial movement within the bulged portion of said third tube.

4. A tubular joint comprising an outer tube having opposing side wall openings, an inner tube extending through said openings and having an end substantially flush with the outer surface of said outer tube adjacent one of said openings, and an axially contractible and transversely expandable insert element having a tubular shank portion disposed within said inner tube and an end flange portion bearing against the outer surface of said outer tube adjacent said one opening, said shank portion of said insert element and the portion of the inner tube disposed within the outer tube bulging outwardly to provide an annular enlargement adjacent said one opening and coacting with said flange to lock said tubes together, said flange restraining axial contraction of said inner tube in one direction.

5. In a method for joining tubular members, the steps of extending one tube through a pair of opposing side wall openings of a larger tube until an end of the smaller tube is substantially flush with the outer surface of the larger tube, inserting a flange-providing element into the open end of said smaller tube until said flange is adjacent the outer surface of the larger tube, and thereafter simultaneously locking the flange-providing element within the smaller tube and the smaller tube within the larger tube by expanding outwardly and contracting axially the flange-providing member and the portion of the smaller tube within said larger tube, said flange engaging the outer surface of said larger tube to restrain contraction of said smaller tube in one direction.

6. In a method for joining tubular members, the steps of extending the end portion of a smaller tube through a pair of opposing side wall openings of a larger tube, inserting an end-flanged internally-threaded tubular expansion element into the open end of said smaller tube until the flange thereof is disposed adjacent the outer surface of the larger tube, and thereafter threading a screw element into the internally-threaded expansion element to contract the expansion element axially and thereby bulge the side walls of said element and said smaller tube outwardly within the confines of the larger tube, said axial contraction forcing said flange into tight contact with the outer surface of said larger tube, said flange limiting said axial contraction in one direction.

7. In a tube joining method, the steps of inserting a first tube into a second tube through at least one side wall opening thereof, inserting the end portion of a third tube transversely through side wall openings of both said first and second tubes, introducing an end-flanged expansion element into the open end of said third tube, and thereafter axially contracting said expansion element to laterally expand the same and simultaneously expand the portion of said third tube within the confines of said first and second tubes, said axial contraction drawing said flange into tight contact with the outer surface of said first tube, said flange limiting said axial contraction of said third tube in one direction.

8. A joint for tubular members comprising a first tube having a pair of opposing side wall openings, a second tube extending through said openings, and an insert element disposed within the portion of the second tube located within said first tube, said insert element having a flanged portion engaging the outer surface of said first tube, said insert element and said second tube being axially contracted and bulging outwardly within said first tube to lock said first and second tubes together, said flanged portion bearing tightly against said outer surface for limiting the axial contraction of said second tube in one direction, said first tube also being provided with a second pair of opposing openings, a third tube extending at right angles to both said first and second tubes and having external dimensions less than said first tube and internal dimensions greater than the bulge of said second tube, said third tube extending through said first and second tubes and having opposing openings and receiving the bulging portion of said second tube.

References Cited in the file of this patent

UNITED STATES PATENTS

| | | | |
|---|---|---|---|
| 1,220,438 | McKenna | Mar. 27, | 1917 |
| 2,614,827 | Peach et al. | Oct. 21, | 1952 |
| 2,647,000 | Colley | July 28, | 1953 |
| 2,690,279 | Ward | Sept. 28, | 1954 |
| 2,763,314 | Gill | Sept. 18, | 1956 |
| 2,803,984 | Swenson | Aug. 27, | 1957 |
| 2,846,249 | Johnson | Aug. 5, | 1958 |
| 2,858,153 | Petersen | Oct. 28, | 1958 |